Feb. 27, 1940.  A. L. V. C. DEBRIE  2,191,849
BOX SHAPED SPOOL FOR FILMS
Filed Dec. 28, 1936  3 Sheets-Sheet 1
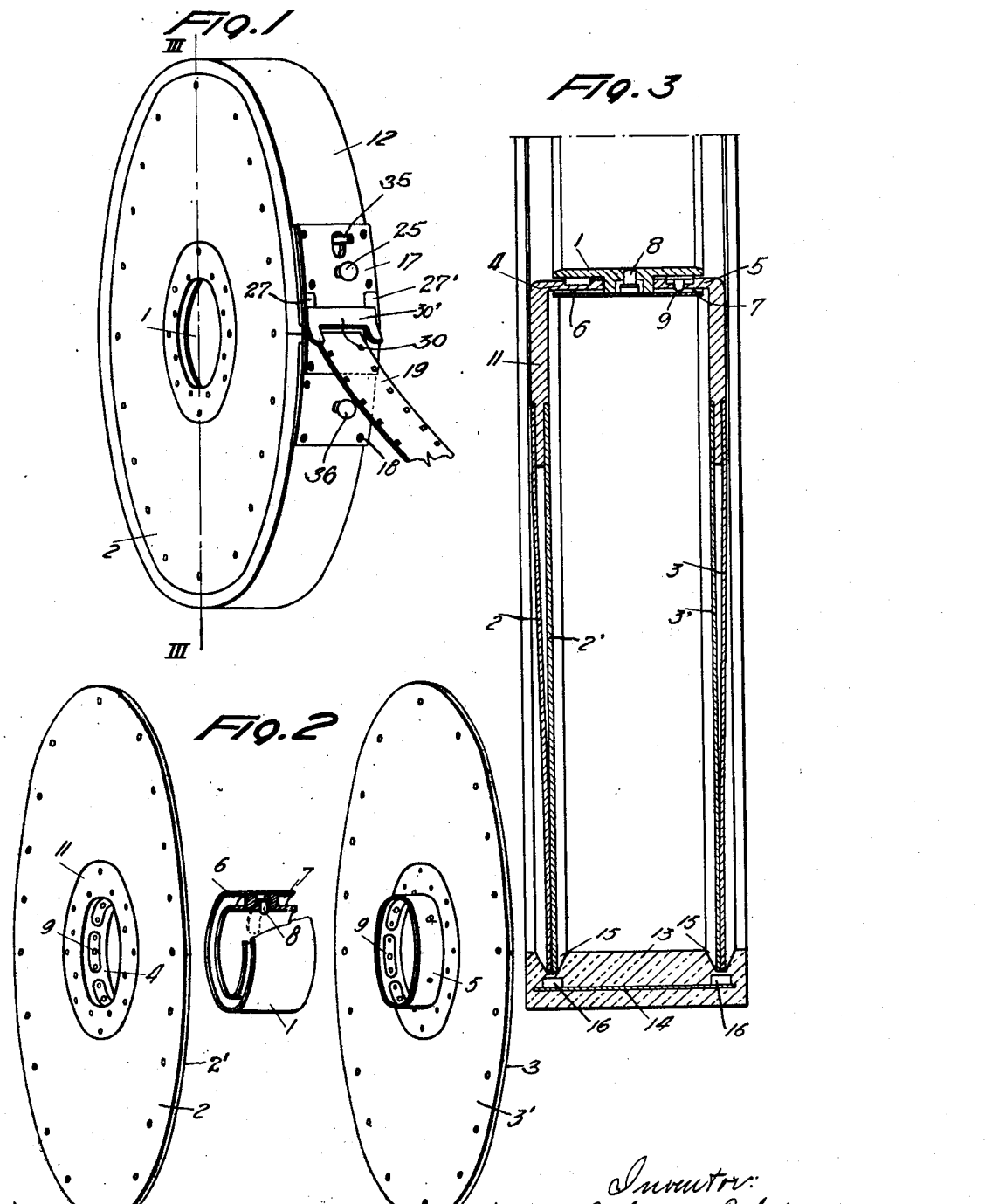

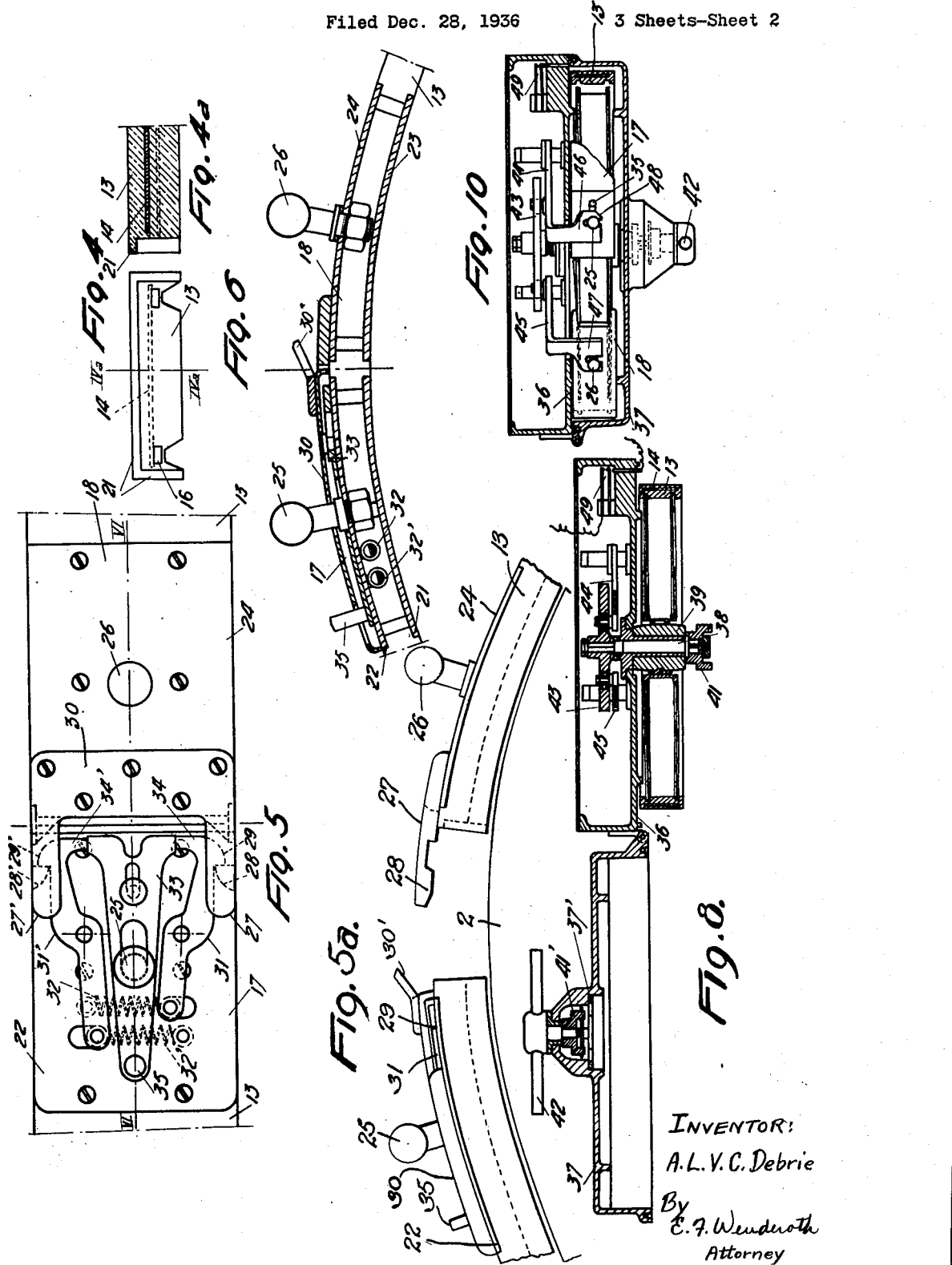

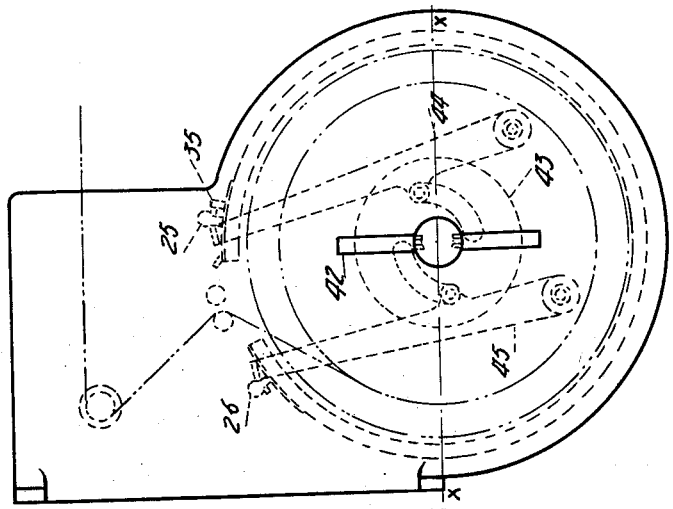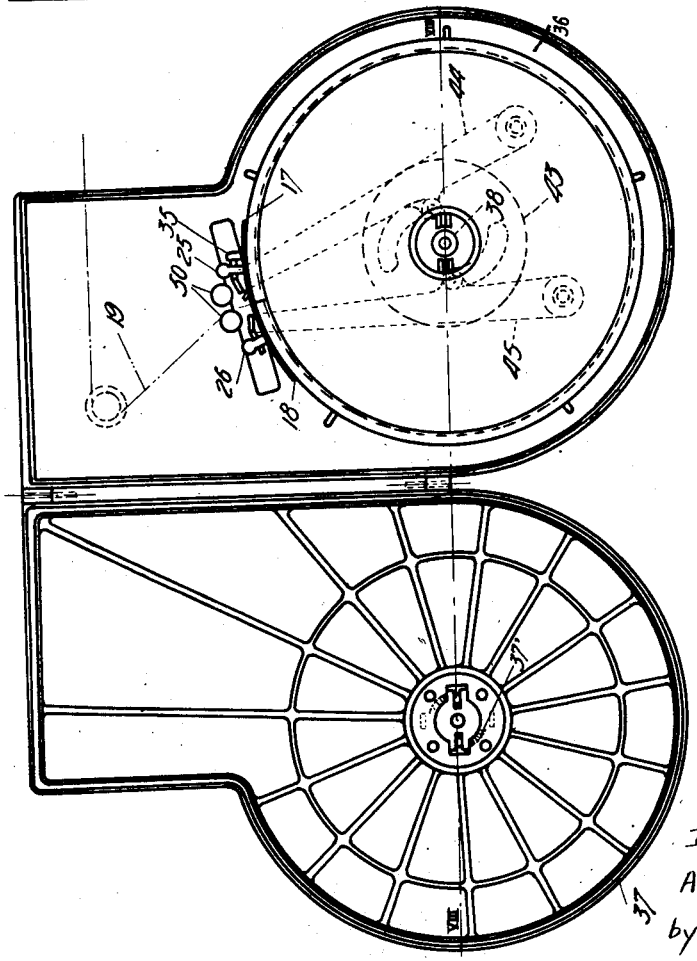

Patented Feb. 27, 1940

2,191,849

UNITED STATES PATENT OFFICE 2,191,849

BOX SHAPED SPOOL FOR FILMS

André Leon Victor Clement Debrie, Paris, France

Application December 28, 1936, Serial No. 117,962
In France October 7, 1936

7 Claims. (Cl. 242—71)

The preparation and commercial working of kinematographic films requires numerous operations and consequently the film is submitted to considerable transportation and handling during which it must be constantly protected against mechanical accidents; it must also be protected, as long as it is not developed, against light.

The film is generally wound off or on spools constituted by a hub and two cheek-plates; the roll formed by the wound film is thus securely held in place, but the film is not protected against the action of light which may blur it when it has not yet been developed. To remove this drawback, it has been proposed to provide the film with ends rendered inactive by a protective coating whereby the outer coils of the roll protect the inner coils against light; this manner of operating is only suitable for very short-lengthed films and cannot be applied in a general manner in the kinematographic industry which operates on and handles considerable lengths of films.

With the devices now in use, the film on its spool is not perfectly protected in practice against the action of light.

There have already been used for transportation and unwinding of films so called box spools constituted by a flat box adapted to be closed in a light tight manner. The film is wound over a hub which is arranged at the centre of the box wherein it may rotate freely; in the cylindrical wall of the box there is provided a slot lined with velvet through which the end of the film may pass between two rollers. With this arrangement the film is protected against light and may be wound or unwound, while the box remains stationary, when it is desired to make it pass through any suitable machine such as a developing machine.

This arrangement which is in current use involves serious drawbacks. On one hand each box-spool requires a pair of rollers which for proper operation must be mounted on ball bearings, which considerably increases the cost of the box. Moreover, these rollers which are generally closely adjacent prevent hooks being used for connecting the different portions of the film together, and the velvet used for preventing the entrance of light into the box spool collects dust which may scratch the film. On the other hand if during transportation, the film is submitted to vibrations or shocks, it may begin to unwind inside the box, which may prevent the subsequent regular feed of the film.

When applying both devices, the film carried in a box-spool is brought on to a spool with cheek plates for unwinding purposes and conversely a film is brought from a spool with cheek plates into a box-spool for transportation. But such handling has the drawback that the coils of the film, when the film edges are not securely held by the ends of the box-spool, are liable to slip longitudinally with reference to each other and thus to move over one another; the film roll assumes then a conical shape and it may be difficult to put these coils back into place especially when some of them are entirely disengaged from the others.

My invention removes these drawbacks and has for its object a box inside which the film is securely held without being capable of unwinding in an untimely manner in said box. The box may serve either for winding and unwinding the film when required and for its transportation. This avoids all detrimental handling of the film.

A further object of the invention consists in means for opening and closing the box inside a closed casing, for instance in a developing machine.

The following description and appended drawings show by way of example a form of execution of my invention.

Fig. 1 shows the whole of the spool as closed by the belt-shaped part.

Fig. 2 shows the hub and cheek-plates forming the spool after dismantling.

Fig. 3 is an enlarged cross-section of the spool through a diametral plane shown at line III—III of Fig. 1.

Figs. 4 and 4a show the ends of the belt in front and cross-sectional view respectively, Fig. 4a being a cross-section along line IVa—IVa of Fig. 4.

Fig. 5 is a plan view with plates removed, Fig. 5a an elevational view, and Fig. 6 a longitudinal section through line VI—VI of Fig. 5, of the belt closing means.

Figs. 7 and 8 are elevational and cross-sectional views of an open casing containing a spool, the cross-section of Fig. 8 being on line VIII—VIII of Fig. 7.

Figs. 9 and 10 show in a similar manner the same casing when closed so as to make the position then assumed by the belt appear, Fig. 10 being a cross-section through line X—X of Fig. 9.

Returning to Figs. 1 to 3, it is apparent that the spool comprises a hub 1 and cheeks or plates 2 and 3 which latter have inturned inner flanges 4 and 5 frictionally engaging the grooves 6 and 7 in the hub. This hub may be rigidly secured to the shaft carrying it through the agency of the spring-urged spigot 8 adapted to enter a recess in said shaft; spring-urged spigots 9 carried by the inturned flanges 4 and 5 of the cheeks may cooperate in securing the latter to the hub; moreover it is possible, within the scope of the invention to secure in a nonremovable manner the hub to either of the cheeks or to both.

In order to provide greater rigidity for the cheeks, each of them comprises two plates 2 and 2' (or 3 and 3') secured each to one side of the annulus 11 integral with the inturned flange 4 (or 5). Said plates 2 and 2' are assembled through their outer periphery so as to form a sort of braced, very rigid system.

For the light-tight closure of the spool thus adapted to serve as a storing box, I wind over the edges of the cheeks 2 and 3 a belt 12 or the like.

This belt shaped part as shown cross-sectionally on Fig. 3 comprises preferably a rubber strip 13 in which is embedded a metal blade 14, of steel for instance. Grooves 15 are provided on the inside of the strip, into which grooves the edges of the cheeks are engaged so as to prevent any transverse slipping of the belt over the spool. It is of advantage for the parts of the belt applied over the edge of the cheeks to be very yielding so as to conform exactly thereto and to provide a perfectly tight closure preventing the passage of light. To this end there are provided between the bottom of the grooves 15 and the steel blade 14 annular channels 16 which considerably increase the flexibility of the corresponding portions of the strip. The belt is closed over the spool by means of a two-part buckle 17—18 secured to its ends.

It is apparent that the mounting is very easy; when the film is wound over the hub 1, the cheeks 2 and 3 are, if required, secured to the latter so as to prevent any deformation of the film roll. The belt is then set in place, care being taken that the outer end 19 of the film should pass between the ends of said belt, the buckle being arranged therefor. The film is then held between the ends of the rubber strip 13 so as to prevent its moving and moreover to prevent light from entering the spool and impressing the film.

In order that the ends of the belt may bear with force against the film it is of advantage to give these the shape shown in front and side views in Figs. 4 and 4a, respectively. Along three sides of the rectangle forming the cross-section of the rubber strip 13, said strip has extensions 21 which are readily crushed at their contact points with the film so as to form a tight closure, the extensions on both ends of the belt strip bearing perpendicularly against the film surface and with the interposition of said film against one another.

I have described with some detail a preferred form of execution of the belt, but it is obvious that many modifications may be made therein without departing from the scope of the invention. For instance the grooves 15 may be omitted and the belt may be provided with inturned flanges adapted to come into contact with the peripheral portion of the cheeks.

As stated hereinabove, it is of advantage to allow removal of the belt closing the spool only inside a space which is itself light-tight. This is the case for instance when it is desired to make an impressed film pass into a developing machine; the invention is obviously not limited to this application which is given here solely by way of example. The film being carried by the closed spool described is set inside the casing of the developing machine which is then closed. The closure of the casing actuates mechanism to be disclosed hereinafter which disengages and separates the parts 17—18 of the buckle. The belt, under the action of the elasticity of the steel band contained therein, is urged to bear against the inner wall of the casing while moving away from the cheeks of the coil which is thus adapted to rotate freely and to allow the unwinding of the film.

Figs. 5 and 6 show a belt buckle system allowing the above disclosed operation. The buckle comprises two parts 17 and 18 formed by metal plates 21'—22 on one hand and 23—24 on the other. These plates 21'—22 (or 23—24) hold between them the ends of the rubber band 13 of the belt. Studs 25 and 26 are provided and may be actuated towards or away from each other to effect engagement or disengagement thereof. The part 18 ends with lugs 27—27' provided at their lower part with tenons 28—28' adapted to be engaged by the hooks 29, 29' carried by the ends of the levers 31—31' pivotally secured to the plate 22 of part 17. Springs 32—32' constantly urge the hooks 29—29' apart. When the parts 17—18 are moved towards one another, the tenons 28—28' which have rounded surfaces push the hooks 29—29' inwards. The hooks are then urged outwards again by the springs 32—32' so as to engage the tenons as shown in Fig. 5.

However the surfaces through which the tenons and hooks remain in contact are inclined relative to the general outer surface of parts 17—18 and if a sufficient action is exerted on the parts 17—18 for moving them apart a sliding motion is provided whereby the levers 31—31' are caused to rock round their pivoting points and the parts 17—18 move away from one another.

Therefore it is necessary to provide locking means which prevent the buckle from opening under the action of a fortuitous tractional stress. These means may comprise as shown a stud 35 carried by a T-shaped tongue 33 guided over the plate 22 by means of slots and studs so as to be allowed only a movement parallel to the longitudinal axis of the buckle. In the position shown in Fig. 5, the cross bar of the T-shaped tongue is engaged between the lateral projections 34—34' of the levers 31—31' and prevents the latter from rocking and thus disengaging the tenons 28—28' from the hooks 29—29'. On the contrary if through action on the stud 35, the tongue 33 is moved towards the left of Figs. 5 and 6, the levers are released and the buckle may open under a sufficient tractional stress.

The above described mechanism is covered by an outer plate 30 which is assumed to be removed on Fig. 5. This outer plate is provided with guides 30' which allow an easier insertion of the lugs 27—27' in position. There is left between the metallic plates of the two parts 17—18 of the buckle, in the closed position, a slot allowing the passage of the film which as stated is held between the ends of the rubber strip.

The casing adapted to receive the spool and the belt-releasing means are illustrated in Figs. 7 to 10. The casing is divided in two chambers separated by a partition 36; one of the chambers, adapted to receive the spool is formed by the closing of the cover 37 while the other chamber containing the mechanism is permanently closed.

A shaft 38 passes through the partition 36 and carries in the first chamber the spool with the interposition of an auxiliary hub 39; this shaft ends with a claw clutch 41 which, when the cover 37 is closed, engages a corresponding claw clutch 41' on the control handle 42. This control handle serves also for actuating the bolting means holding the cover 37 in its closed position, the rear side of the clutch 41 engaging to this end the aperture 37' formed in a plate secured to the cover 37.

The shaft 38 carries in the second chamber a grooved cam 43 adapted to act on two levers 44—45 pivoting round their inner ends. At their upper or outer ends these levers carry claws 46—47 folded at right angles and they enter, through slots provided in the partition 36, the front chamber containing the spool. These claws are provided with notches adapted to engage the studs 25—26 on the belt buckles; the claw 46 is terminated by a wedge shaped part 48 which engages, when the spool is set in its chamber, between the stud 25 and the buckle bolting stud 35; thus the wedge 48 may move the stud 35 away from the stud 25 so that the tongue 33 moves into its releasing position. Consequently it is merely necessary to force the studs 25 and 26 apart when it is desired to open the buckle; this is performed through a rotation of cam 43 produced by operation of the control handle 42. The grooves of the cam engaging rollers secured to the levers 44 and 45 move said levers apart and therewith the studs 25—26; the buckle opens then and the belt expands under the action of the steel blade and bears against the inner wall of the cover 37 of the casing. When for any reason it is desired to open the casing, the control handle is moved backwards which makes the levers 44 and 45 move nearer one another and consequently the two ends of the buckle reengage one another. Thus it is possible, after cutting off the part of the film which may have passed out of the spool, to remove it from the casing without exposing to the light the part remaining inside the spool.

A number of detail arrangements advantageously complete the above disclosed casing. When the spool is in place in the open casing, the levers should be in the position illustrated in Fig. 7 so that the knobs 25—26 are engaged by the claws 46—47 whereby the angular position of the shaft 38 and consequently that of the part 41 of the claw clutch carried thereby are perfectly defined. It is therefore essential that as long as the cover is open and part 41 in the above defined position, the control handle 42 should be bolted in a position for which part 41' of the clutch integral with said handle is in the position required for engagement with part 41. The control handle is only released for operation of cam 43 when the cover 37 is closed and the clutch is consequently reengaged. The bolting and bolt releasing means for the handle are of any obvious well known type and need not be described.

It is also important that the belt should not be allowed release until, the cover being closed, the handle 42 has rotated through the angle required for bolting the cover in its closed position; to this end the cam 43 is designed so as to make the levers 44—45 begin rotating only when the handle 42 controlling the cam has rotated through said angle.

Lastly it is necessary for closing the belt buckle, to move towards one another its two portions, beyond the engagement position of their hooks and tenons so that the engagement between the latter may be performed without difficulty. To this end, the grooves in the cam show a slight extension of their end portion, in which the lever rollers lie when they provide the closure of the buckle.

The cover 37 when it closes actuates an electric switch 49 (Figs. 8 and 10) which in its turn operates an alarm signal which may be visual or acoustic and which ceases only when the cover 37 is perfectly closed.

Lastly as it passes out of the box the film 19 passes between two rollers 50 secured to said casing; these two rollers replace those required heretofore on each spool box. Thus I provide a considerable economy even if the rollers 50 are machined with the utmost care and are mounted for instance on ball bearings; it is easy to arrange these rollers so as to allow the passage of those portions of the film which are hooked together.

It would of course be easy without departing from the scope of my invention to bring numerous modifications to the mechanical arrangements which have been described above solely by way of example; in particular the control of the opening may be performed through a control handle eccentrically arranged with reference to the spool. The same control handle may be used simultaneously for opening several spool boxes.

What I claim is:

1. Film carrying means comprising a spool adapted to carry the wound film including a hub and two cheeks secured to said hub and a belt, yielding throughout its length, adapted to be stretched over the outer periphery of both cheeks in a perfectly light-tight contact therewith, with the opposite ends of said belt facing each other with a gap allowing the light-tight passage of the end of the film on the spool, and releasable means for forcing said opposed ends of the belt into frictional engagement with the opposite sides of the end of the film passing through the gap.

2. Film carrying means comprising a spool adapted to carry the wound film including a hub and two cheeks secured to said hub and a belt, yielding throughout its length, adapted to be stretched over the outer periphery of both cheeks in a perfectly light-tight contact therewith, with the opposite ends of said belt facing each other with a gap allowing the light-tight passage of the end of the film on the spool and releasable means for forcing said opposed ends of the belt into frictional engagement with the opposite sides of the end of the film passing through the gap, said releasable means including interengaging parts, a complementary part slidingly secured to one of the interengaging parts and adapted to hold the said interengaging parts in engagement and double means for controlling the longitudinal position of the interengaging parts and that of the sliding part for engagement and disengagement of said interengaging parts.

3. A film handling device comprising a spool adapted to carry the wound film including a hub and two cheeks secured to said hub and a belt, yielding throughout its length, adapted to be stretched over the outer periphery of both cheeks in a perfectly light-tight contact therewith, with the opposite ends of said belt facing each other with a gap allowing the light-tight passage of the end of the film on the spool, releasable means for forcing said opposed ends of the belt into frictional engagement with the opposite sides of the end of the film passing through the gap, a casing adapted to contain the spool and belt, a cover therefor, means controlling the position of the releasable means, and means carried by and passing through the cover and adapted to operatively engage, when the cover is closed, the means controlling the releasable means.

4. A film handling device comprising a spool adapted to carry the wound film including a hub and two cheeks secured to said hub and a belt, yielding throughout its length, adapted to be stretched over the outer periphery of both cheeks in a perfectly light-tight contact therewith, with the opposite ends of said belt facing each other with a gap allowing the light-tight passage of the end of the film on the spool, releasable means for forcing said opposed ends of the belt into frictional engagement with the opposite sides of the end of the film passing through the gap, a casing adapted to contain the spool and belt, a cover therefor, a grooved cam rotatably carried by the casing, two levers pivotally secured to the casing, engaging the grooves in the cam and adapted to bring the releasable means into their operative and reversely into their inoperative released position, and means carried by and passing through the cover and adapted to operatively engage, when the cover is closed, the rotatable cam.

5. A film handling device comprising a spool adapted to carry the wound film including a hub and two cheeks secured to said hub and a belt, yielding throughout its length, adapted to be stretched over the outer periphery of both cheeks in a perfectly light-tight contact therewith, with the opposite ends of said belt facing each other with a gap allowing the light-tight passage of the end of the film on the spool, releasable means for forcing said opposed ends of the belt into frictional engagement with the opposite sides of the film passing through the gap, said releasable means including interengaging parts, a complementary part slidingly secured to one of the interengaging parts and adapted to hold the said interengaging parts in engagement and double means for controlling the longitudinal position of the interengaging parts and that of the sliding part for engagement and disengagement of said interengaging parts, a casing adapted to contain the spool and belt, a cover therefor, a grooved cam rotatably carried by the casing, two levers pivotally secured to the casing, engaging respectively on one hand, the grooves in the cam and on the other one of the double means for controlling the longitudinal position of the interengaging parts and that of the sliding part of the releasable means and means carried by and passing through the cover and adapted to operatively engage the cam when the cover is closed.

6. A film handling device comprising a spool adapted to carry the wound film including a hub and two cheeks secured to said hub and a belt, yielding throughout its length, adapted to be stretched over the outer periphery of both cheeks in a perfectly light-tight contact therewith, with the opposite ends of said belt facing each other with a gap allowing the light-tight passage of the end of the film on the spool, releasable means for forcing said opposed ends of the belt into frictional engagement with the opposite sides of the end of the film passing through the gap, a casing adapted to contain the spool and belt, a cover therefor, a grooved cam rotatably carried by the casing, two levers pivotally secured to the casing, engaging the grooves in the cam and adapted to first produce a bolting of the closed casing and then to bring the releasable means into their operative and reversely into their inoperative released position, and means carried by and passing through the cover and adapted to operatively engage, when the cover is closed, the rotatable cam.

7. In a film handling device as claimed in claim 3, a rotatable shaft forming part of the means carried by and passing through the cover, means carried by said shaft for locking the cover of the casing in its closed position relative to the casing, and further means controlled by said shaft for bolting the releasing means as long as the cover is open.

ANDRÉ LEON VICTOR CLEMENT DEBRIE.